(No Model.)
L. RISSMULLER.
PROCESS OF TREATING GARBAGE.
No. 596,008. Patented Dec. 21, 1897.
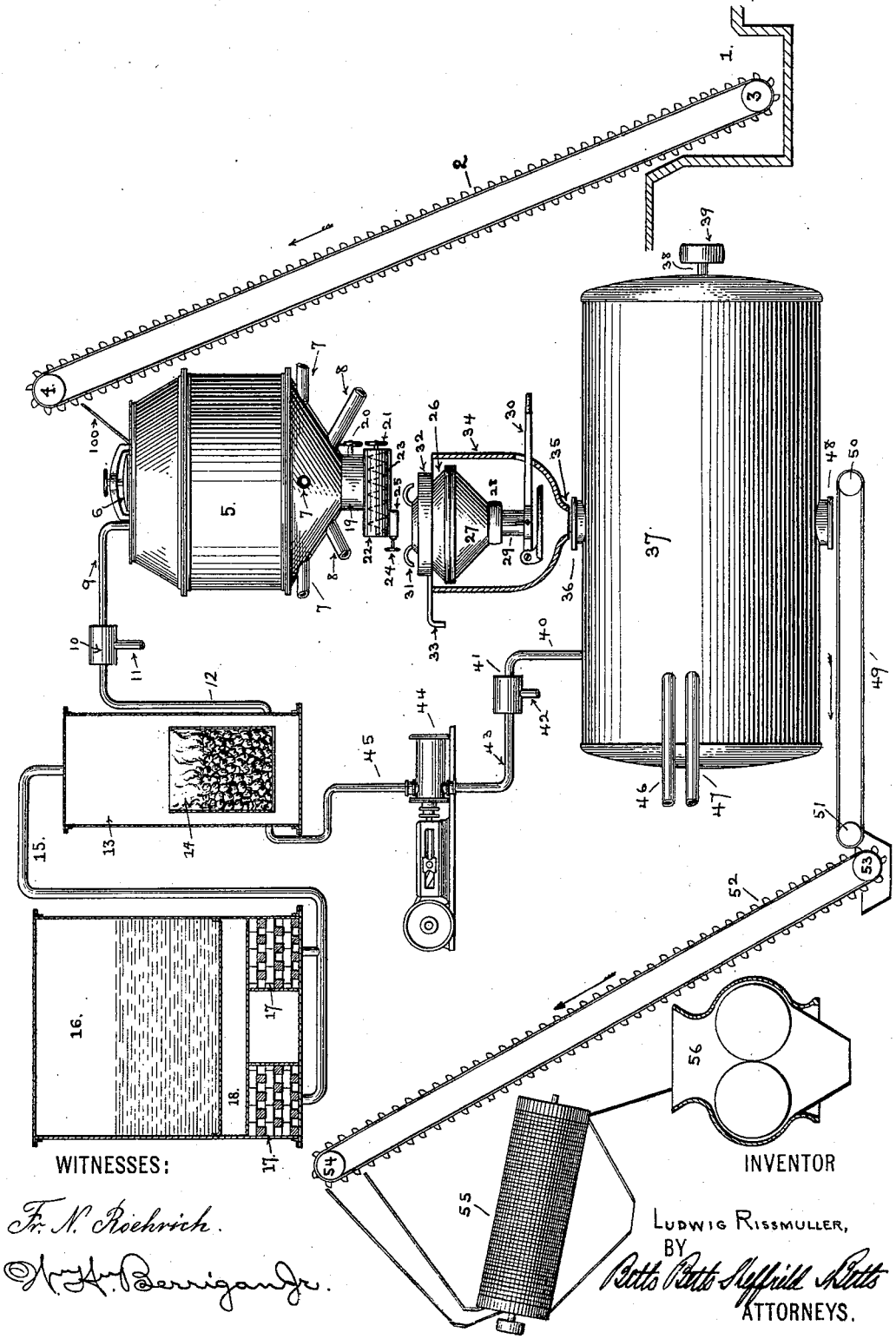
WITNESSES:
Fr. N. Roehrich.
N. H. Berrigan Jr.
INVENTOR
Ludwig Rissmuller,
BY
Betts Betts Sheffield Betts
ATTORNEYS.

UNITED STATES PATENT OFFICE.

LUDWIG RISSMULLER, OF PHILADELPHIA, PENNSYLVANIA, ASSIGNOR, BY MESNE ASSIGNMENTS, TO THE GENERAL AMERICAN REDUCTION COMPANY, OF NEW YORK, N. Y.

PROCESS OF TREATING GARBAGE.

SPECIFICATION forming part of Letters Patent No. 596,008, dated December 21, 1897.

Application filed July 13, 1897. Serial No. 644,454. (No specimens.)

*To all whom it may concern:*

Be it known that I, LUDWIG RISSMULLER, a citizen of Germany, residing at Philadelphia, county of Philadelphia, State of Pennsylvania, have invented certain new and useful Improvements in Processes of Treating Garbage, of which the following is a full and accurate description, reference being had to the accompanying drawing, which shows a garbage-treatment plant embodying my improvements.

It is the object of my invention to provide a new and improved method for treating city garbage and animal or vegetable waste matters for the purpose of extracting the greases therefrom, converting the non-volatile residuum into a fertilizer, and to utilize the released gaseous products for fuel purposes.

My new process consists in boiling the garbage or waste matters until converted into a uniform soupy fluid containing the greases in the form of an emulsion, in leading away the gases and vapors evolved during the boiling operation, in separating the gases from the vapors, and in utilizing the said gases for fuel purposes.

It further consists in separating the greases from the digested waste matters.

It further consists in drying the non-greasy residuum to convert the same into fertilizer, and in leading away the gases and vapors evolved during the drying operation, the gases being used for fuel purposes.

In the accompanying drawing, 1 indicates a pit into which the garbage or other waste animal or vegetable matter is dumped. Quantities of such garbage (freed from stones, tin cans, &c., by the use of pitchforks or shovels) are fed onto the endless traveling conveyer 2, passing around lower pulley 3 and upper pulley 4, and the garbage is deflected by plate 100 into the digester 5 through the manhole 6 thereof. When the digester has been filled, or nearly so, the operation of the conveyer is stopped or the feeding of garbage thereto is discontinued. In lieu of the conveyer shown any other suitable form may be employed, or, if preferred, the garbage may be transferred directly into the digester 5 by means of pitchforks or shovels. A sufficient quantity of garbage having been passed into the digester the manhole 6 is closed and steam is forced through pipes 7 and 8 into the digester. In most cases it will be found necessary to add sulfuric acid to the mass of garbage in the digester before closing the manhole 6, and the interior of the digester is lined with lead or other material capable of resisting acids. The boiling of the garbage is continued until it is converted into a soupy liquid uniform throughout and containing the greases in the form of an emulsion. This brings the greases to a state which enables their complete separation from the non-greasy ingredients.

During the boiling of the garbage in the closed digester the lightly volatile ingredients are evaporated from the garbage, due to the heating of the garbage either with or without the use of sulfuric acid, and vapors and gases are also evolved. In order to carry the vapors and gases off, I provide a pipe 9, leading out of the top of the digester and terminating in a condenser 10. The condenser is provided with a pipe 11 for carrying off the distilled water and may lead to a sewer or other point. The gases, separated from the vapors, are led from the condenser by a pipe 12 into the lower end of a gas-producer 13. This gas-producer contains a body 14 of burning coals or other heating and gas-producing material or other heating structure. The gases pass upwardly through the heated material, and this results in heating the gases to a point where, in combination with the producer-gas, they may be readily used for fuel purposes. The heated gases are led by pipes 15 from the heater 13 and into the regenerating-chambers 17 17 of the furnace of the steam-generator 16 and pass up into the combustion-chamber 18. By my invention, therefore, the obnoxious vapors and gases are led out of the digester, the vapors are separated from the gases, and the gases are utilized for fuel purposes. The steam made in boiler 16 may be used to supply the digester or to turn the machinery of the plant or for other purposes.

The connections between the digester and condenser, between the condenser and heater, and between the heater and the furnace may be quite different from the forms or arrangements illustrated in the accompanying drawings.

Recurring to the digester 5, when the garbage therein has been sufficiently digested a valve 20 (in a neck 19 at the lower end of the digester) is opened. This allows the digested garbage to fill a measuring-chamber 22, comprising a hollow chamber commencing underneath the neck 19 and terminating at valve 24 in the delivery-neck 25. Within the measuring-chamber and running lengthwise thereof there is an endless screw 23, which may be operated by turning the handle 21. By means of this screw the feeding of digested garbage may be controlled when the valve 24 is opened. In practice the inlet-valve 20 is opened until the measuring-chamber 22 is filled and then said valve is closed. After this, outlet-valve 24 is opened and the digested garbage discharged from the measuring-chamber and into the apparatus for separating the greases therefrom.

Instead of the measuring-chamber shown any other suitable form may be employed. The same is true of the screw 23.

The particular form of centrifugal separator which I prefer to employ is that described and shown in my pending application, Serial No. 624,018, filed February 18, 1897, for centrifugal separators, to which I refer for a more detailed description than is herein given. In general it consists of a bowl comprising an upper bowl-section 26 and a lower bowl-section 27, a pulley 28, a sleeve 29, driven by the pulley, and a hand-lever 30 and connections for lifting the upper section 26 away from the lower section, whereby a continuous peripheral discharge-port is formed. The sections of the bowl having been brought tightly together, the valve 24 of the measuring-chamber is opened and a quantity of digested matter is discharged (assisted by the screw 23) into the rotating bowl of the centrifugal separator. Within the bowl the ingredients of the digested garbage are separated in accordance with their respective specific gravities, being generally divided into three concentric rings, the first comprising the freed and purified greases, the second containing the acids and substances dissolved thereby, and the third comprising the non-greasy heavy solid ingredients. The greases are spun out through pipes 31 31 and are caught by the fixed ring-like pan 32, surrounding, but out of contact with, the upper bowl-section. By means of a pipe 33 the greases are led from said pan into any suitable receptacle. When the greases have been separated from the mass within the bowl, the workman lifts the lever 30, and with it a shaft within the sleeve 29. The upper bowl-section 26 is secured to the upper end of said shaft, and is therefore lifted away from the lower section 27 of the bowl. The continued rotary movement of the bowl results in the complete expulsion of all the heavy and acidulated ingredients from the bowl, and the sections are then brought together ready for treating another quantity of digested garbage. The substances expelled from the bowl strike against the inner surface of a mantle 34, which encircles the bowl and extends above the point of separation of the bowl-sections. Said mantle terminates in a delivery-port 35, whereby all the substances expelled by the bowl are brought to the same point.

The form of centrifugal separator herein stated to be preferred is fully described and shown in my pending application for Letters Patent, Serial No. 624,018, filed February 18, 1897.

My method for separation of greases from digested garbage may, however, be practiced with other forms of centrifugal separators than that herein described and shown. For instance, in lieu of the split-bowl centrifuge controlled by a lever a split-bowl centrifuge which automatically opens at certain pressures of the heavier ingredients may be employed, or, if desired, any other suitable form of centrifugal separator may be used. The non-greasy ingredients are dumped into a drier 37 through a manhole 36, being treated (either before or after being dumped into the drier) with some substance which neutralizes the free acids. The drier having been filled, or nearly so, the manhole is closed and the drier is heated. During the drying operation the contents of the drier are kept in motion by stirrers carried by a shaft 38, driven by a pulley 39. This keeps the drying material in a granular condition and hastens the treatment of the same. The gases and vapors evolved in the closed drier are carried off by a pipe 40 and are led into a condenser 41, wherein the steam is condensed and the distilled water is led out through pipe 42. The separated gases are carried by a pipe 43 into a vacuum-pump 44 and from thence by pipe 45 to the gas-heater 13, hereinbefore referred to. The drier is heated by means of steam introduced through pipes 46 and 47, and this steam may be taken from the boiler 16 or other point. When the contents of the drier are considered sufficiently dry, a manhole 48 in the bottom of the drier is opened, and the dried material, now ready for use as a fertilizer, is conveyed by a belt 49 (passing around pulleys 50 and 51) to a second conveyer 52, passing around pulleys 53 and 54. The last-named conveyer delivers the dried ingredients onto a revolving screen 55, the smaller portions passing between the meshes of said screen and the larger portions rolling or passing over the screen into a grinder or crusher 56. After grinding the tailings may be thrown upon the conveyer 52 for rescreening and, if necessary, regrinding.

While I have shown two conveyers for transferring the dried material to the screen, yet either or both of them may be dispensed with.

I do not herein claim the broad method of treating waste matters, which consists in digesting the waste and then subjecting the digested waste to centrifugal action for the purpose of separating greases therefrom, said method being described and claimed in my pending application, Serial No. 609,410, filed October 20, 1896, for patent for treatment of garbage, my present invention being confined to a process wherein the gases evolved during the digesting of the waste are conveyed to a furnace, wherein the heat of said gases is raised to a temperature rendering them suitable for combustion, and utilizing said gases as fuel to render them inoffensive.

The apparatus hereinbefore described and shown are not herein claimed, but are made the subject-matters of the claims of my pending application, Serial No. 653,437, filed September 29, 1897, for patent for apparatus for treating waste matters, filed as a division of my present application.

What I claim is—

1. The unitary method of inoffensively treating waste matters and economically converting the same into merchantable products, which consists in subjecting the same to the following steps; boiling the raw waste with acid in a digester until the structure of the waste is destroyed and the greases rendered therefrom, conveying the gases evolved to a furnace, raising the heat of said gases to a temperature rendering them suitable for combustion, utilizing said gases as fuel and thereby rendering them inoffensive, subjecting the digested waste to centrifugal action, to remove greases therefrom, and drying the residue, substantially as and for the purpose described.

2. The unitary method of inoffensively treating waste matters and economically converting the same into merchantable products, which consists in subjecting the same to treatment by the power and heat generated from fuel supplied by the gases evolved thereby, in connection with producer-gases, such treatment consisting in boiling the raw waste with acid in a digester until the structure of the waste is destroyed and the greases rendered therefrom, conveying the gases evolved to a furnace, raising the heat of the gases to a temperature rendering them suitable for combustion, utilizing said gases as fuel and thereby rendering them inoffensive, subjecting the digested waste to centrifugal action to remove greases therefrom, and drying the grease-freed substances, substantially as and for the purpose described.

In witness whereof I have hereunto signed my name this 30th day of June, 1897.

LUDWIG RISSMULLER.

In presence of—
DAVID FULLAWAY,
HENRY RAINEY.